E. L. HAWLEY.
INCLINATION INDICATOR.
APPLICATION FILED JULY 19, 1918.
1,288,579.
Patented Dec. 24, 1918.
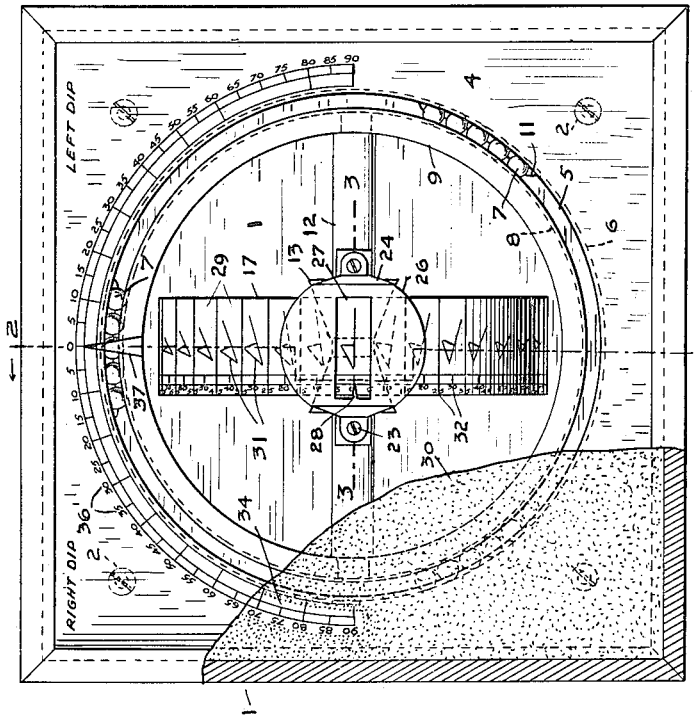
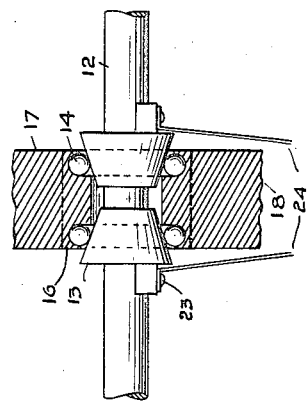
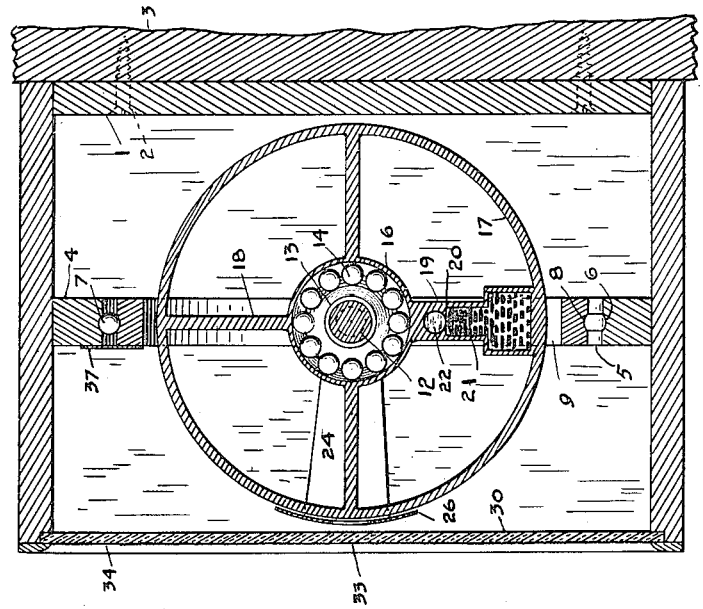
INVENTOR
E. L. HAWLEY
BY F. M. Wright
ATT'Y.

UNITED STATES PATENT OFFICE.

EUGENE L. HAWLEY, OF SAN FRANCISCO, CALIFORNIA.

INCLINATION-INDICATOR.

1,288,579.  Specification of Letters Patent.  Patented Dec. 24, 1918.

Application filed July 19, 1918. Serial No. 245,599.

*To all whom it may concern:*

Be it known that I, EUGENE L. HAWLEY, a citizen of the United States, residing at San Francisco, in the county of San Francisco and State of California, have invented new and useful Improvements in Inclination-Indicators, of which the following is a specification.

It is difficult, and indeed almost impossible, for an aviator, when his airship is in a cloud, to determine, unaided by vision of the earth's surface, at what angle his airship is inclined to said surface. He may even be flying upside down without being aware of it. Serious accidents have arisen from this cause.

It is the object of the present invention to provide means which will at all times indicate to the aviator what angles the longitudinal and lateral axes of his airship make with the earth's surface.

In the accompanying drawing, Figure 1 is a broken front view of my improved indicating device; Fig. 2 is a vertical section of the same on the line 2—2 of Fig. 1; Fig. 3 is a detail section on the line 3—3 of Fig. 2.

Referring to the drawing, 1 indicates a box-like frame attached, as by screws 2, through the bottom thereof to a fuselage 3 of an airship. Extending substantially midway of said frame is a vertical wall 4 having a large, central circular opening 5. The edge of this opening is concave to form a runway 6 in pockets 11 in which can rotate balls 7 arranged in groups, preferably three in number, and there being preferably five balls in each group. The balls can also run in a runway 8 formed on the outer edge of a ring or wheel 9 in said circular opening, and, by means of said balls, the ring 9, although free to rotate in said opening 5, is maintained in the same plane as the wall 4. Extending diametrically across the ring 9 is a fixed shaft 12, and around said shaft are oppositely directed fixed cones 13, on which can run rings of balls 14, which are contained in circular recesses in a hub 16 of a wheel 17, said hub being connected to the periphery by three spokes 18 and a fourth spoke 19. The spoke 19 is of greater width than the spokes 18 and is formed with a cavity 20 in which is contained mercury 21 supplied through an opening closed by a stopper 22. The great weight of the mercury prevents the wheel 17 from rotating about its axis.

Secured, as shown at 23, to the shaft 12, are arms 24 of an indicator frame 26 having a curved central portion situated closely adjacent to the periphery of the wheel 17 and formed with a slot 27 of substantially the same length as the width of said periphery, said central portion having a pointer 28 extending into said slot. The periphery of the wheel is divided by markings into segments 29, each of substantially the same width as the slot, so that when, owing to the variations in the inclination to the earth's surface of the longitudinal axis of the airship, the indicator frame 26 travels over the periphery of the wheel 17, the slot 27 also travels over said segments 29 in succession. Symbols 31 thus appear through said slot in succession. These symbols are so formed that by the inclination of a part thereof they furnish to the aviator a rough indication of the angle of inclination to the earth's surface of the longitudinal axis of his airship. A more exact indication is afforded by graduation marks 32 on a margin of the periphery of the wheel 17, said marks appearing in succession beneath the pointer 28 and indicating by differences of five degrees the exact angle of inclination to the earth's surface of the longitudinal axis of the airship.

For the purpose of determining the inclination to the earth's surface of the lateral axis of said airship there is provided a pointer 37 secured to the periphery of the wheel 17 and which extends over graduation marks 36 on the marginal portion of the wall 4 adjacent to the upper half of the central opening 5, the uppermost graduation mark being zero, and the marks progressively increasing from said uppermost mark by five degrees at a time to 90 degrees. The dip of the airship to the right will be indicated by the graduation marks 36 on the left and conversely.

The box-like frame 1 is inclosed in front by a sheet 30 of ground glass which, being opaque, conceals the whole of the interior of the box with the exception of the parts thereof which indicate the inclinations, and for this purpose it has a central transparent portion 33 and an arcuate transparent portion 34 extending over the graduation marks 36.

Since the weighted portion of the wheel 17 prevents from rotation about its axis not only the wheel 17 itself, but also the ring 9, the aviator, by observing the graduation marks 32, 36, can determine not only the longitudinal inclination, but also the lateral inclination, of his airship.

While I have herein described and claimed the invention as being attached to an airship, it is obvious that it may also be used for indicating the angles of inclination to the earth's surface of the longitudinal and lateral axes of any body in which it may be contained, such as, for instance, a submarine vessel.

I claim:—

1. In a device of the character described, the combination of a frame having a circular opening, a ring therein, the edges of said opening and ring being recessed to form a runway, balls in said runway, a shaft extending diametrically across said ring, a wheel weighted on one side and rotatable on said shaft, ball bearings between said shaft and wheel, an indicator frame secured to said shaft and having an indicating portion closely adjacent to the periphery of said wheel, said periphery having thereon symbols located to be in close proximity to said indicating portions as said indicator frame moves relatively to said wheel, and varying in character to indicate the various positions of the wheel with reference to the indicator frame, and a pointer on said ring, the edge of the opening having graduation marks to indicate the extent of rotation of said ring relatively to said frame.

2. In a device of the character described, the combination of a frame having a circular opening, a ring therein, the edges of said opening and ring being recessed to form a runway, balls in said runway, a shaft extending diametrically across said ring, a wheel weighted on one side and rotatable on said shaft, ball bearings between said shaft and wheel, an indicator frame secured to said shaft and having a slotted indicating portion closely adjacent to the periphery of said wheel, and an indicator extending into said slot, said periphery being marked with symbols located to be visible through said slot as said indicator frame rotates relatively to said wheel, said symbols varying in character to indicate the various positions of the wheel with reference to the indicator frame, and having graduation marks so located that they move in succession beneath said indicator as the wheel rotates, a pointer on said ring, the edge of said opening having graduation marks to indicate the extent of rotation of said ring relatively to said frame.

E. L. HAWLEY.